(No Model.) 5 Sheets—Sheet 1.
P. GOLDSTEIN & G. ANDRAE.
MACHINE FOR CUTTING LACES.

No. 567,130. Patented Sept. 8, 1896.

WITNESSES:
Wm. H. Canfield Jr.
Marcy J. Trusdell.

INVENTORS:
Philip Goldstein
and
Gustav Andrae,
BY
Fred C. Fraentzel,
ATTORNEY

THE NORRIS PETERS CO., PHOTO-LITHO., WASHINGTON, D. C.

(No Model.) 5 Sheets—Sheet 2.
P. GOLDSTEIN & G. ANDRAE.
MACHINE FOR CUTTING LACES.
No. 567,130. Patented Sept. 8, 1896.
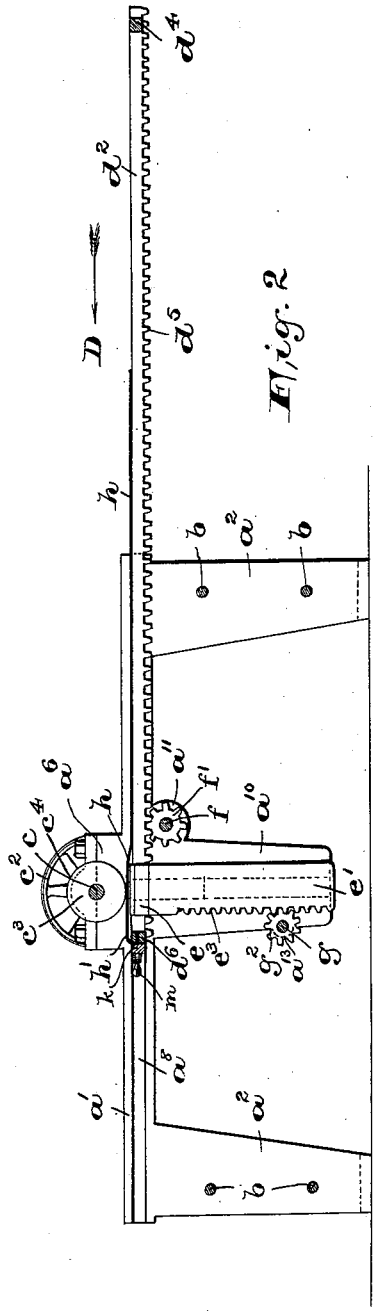
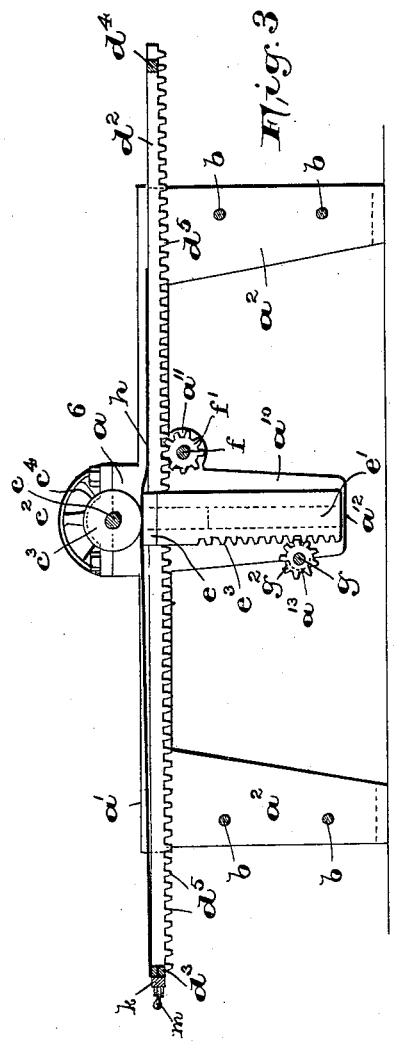
WITNESSES:
INVENTORS:
Philip Goldstein
and
Gustav Andrae,
BY
Fred C. Fraentzel.
ATTORNEY (No Model.) 5 Sheets—Sheet 3.

P. GOLDSTEIN & G. ANDRAE.
MACHINE FOR CUTTING LACES.

No. 567,130. Patented Sept. 8, 1896.

WITNESSES:

INVENTORS:
Philip Goldstein
and
Gustav Andrae,
BY
Fred C. Fraentzel,
ATTORNEY

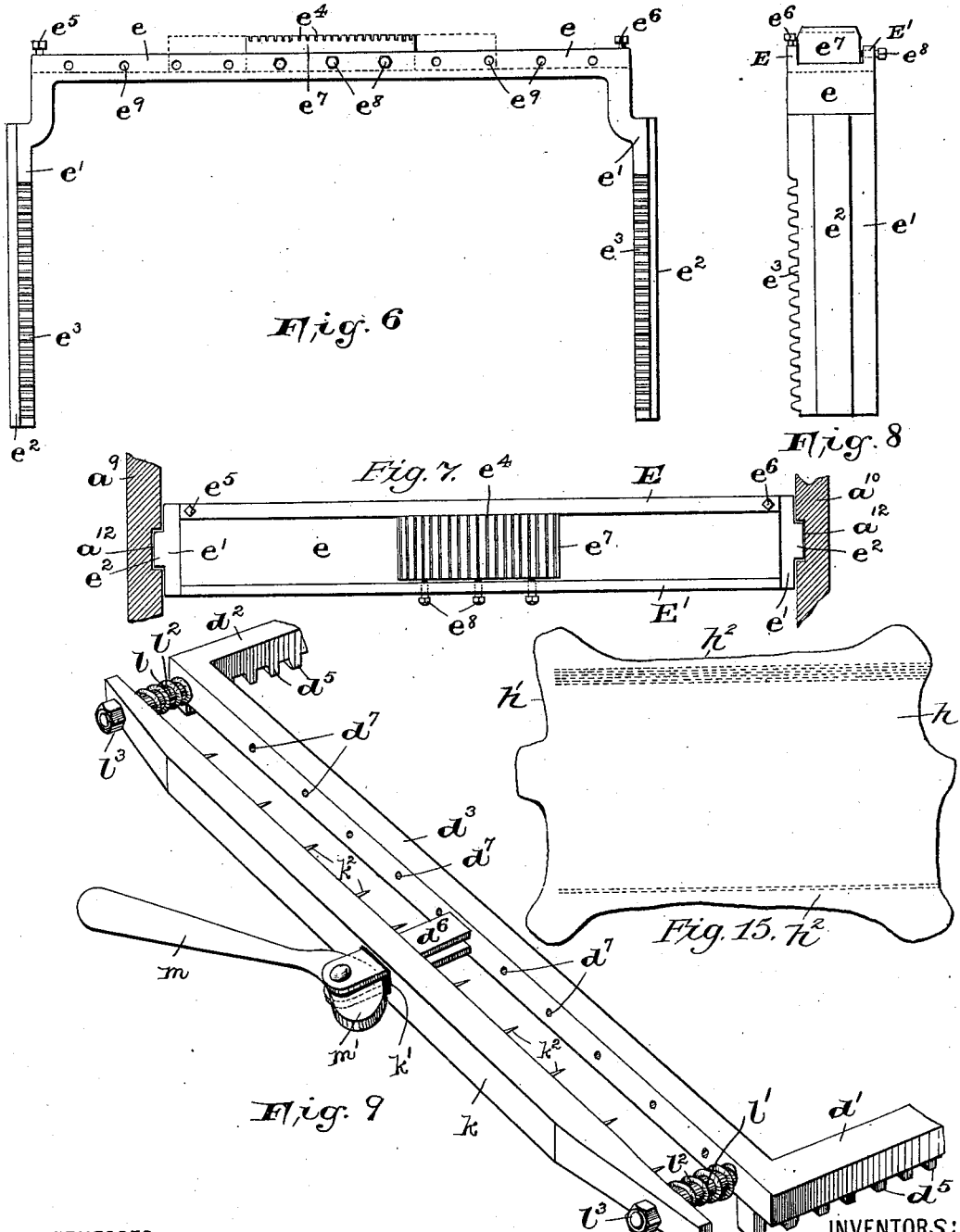

(No Model.)  5 Sheets—Sheet 5.

P. GOLDSTEIN & G. ANDRAE.
MACHINE FOR CUTTING LACES.

No. 567,130. Patented Sept. 8, 1896.

WITNESSES:
Wm. H. Canfield, Jr.
Marcy Z. Trusdell.

INVENTORS:
Philip Goldstein
and
Gustav Andrae,
BY
Fred C. Fraentzel,
ATTORNEY

THE NORRIS PETERS CO., PHOTO-LITHO., WASHINGTON, D. C.

UNITED STATES PATENT OFFICE.

PHILIP GOLDSTEIN AND GUSTAV ANDRAE, OF NEWARK, NEW JERSEY; SAID ANDRAE ASSIGNOR TO SAID GOLDSTEIN.

MACHINE FOR CUTTING LACES.

SPECIFICATION forming part of Letters Patent No. 567,130, dated September 8, 1896.

Application filed February 1, 1895. Serial No. 536,911. (No model.)

*To all whom it may concern:*

Be it known that we, PHILIP GOLDSTEIN and GUSTAV ANDRAE, citizens of the United States, residing at Newark, in the county of Essex and State of New Jersey, have invented certain new and useful Improvements in Machines for Cutting Laces or the Like; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The purpose of this invention is to provide a machine for the cutting of hides or skins or other material into strips or laces, and especially shoe-laces, which shall be of a simple construction and in which the skin or hide or other material to be cut can be readily mounted and cut up into long and narrow strips or laces of an uniform width, avoiding any undue waste and extra handling.

The invention therefore relates generally to cutting-machines, but has for its primary object to provide a machine of this class having, in combination with a set of rapidly-revolving cutters, a flat horizontal cutting table or strip movably arranged in the frame of the machine, a horizontally-moving frame or carriage, and means for operating said parts.

The nature of the present invention consists in the arrangement and combinations of parts, such as will be hereinafter fully described and claimed, reference being had to the accompanying drawings, in which—

Figure 1:
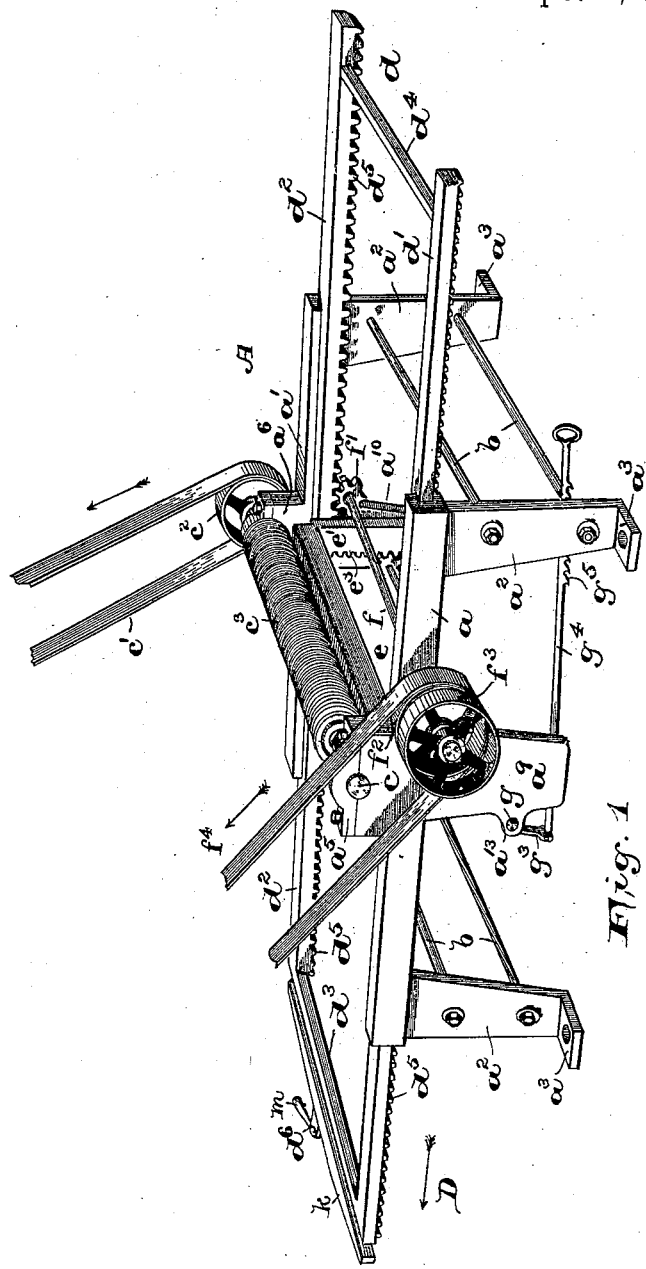
Figure 4:
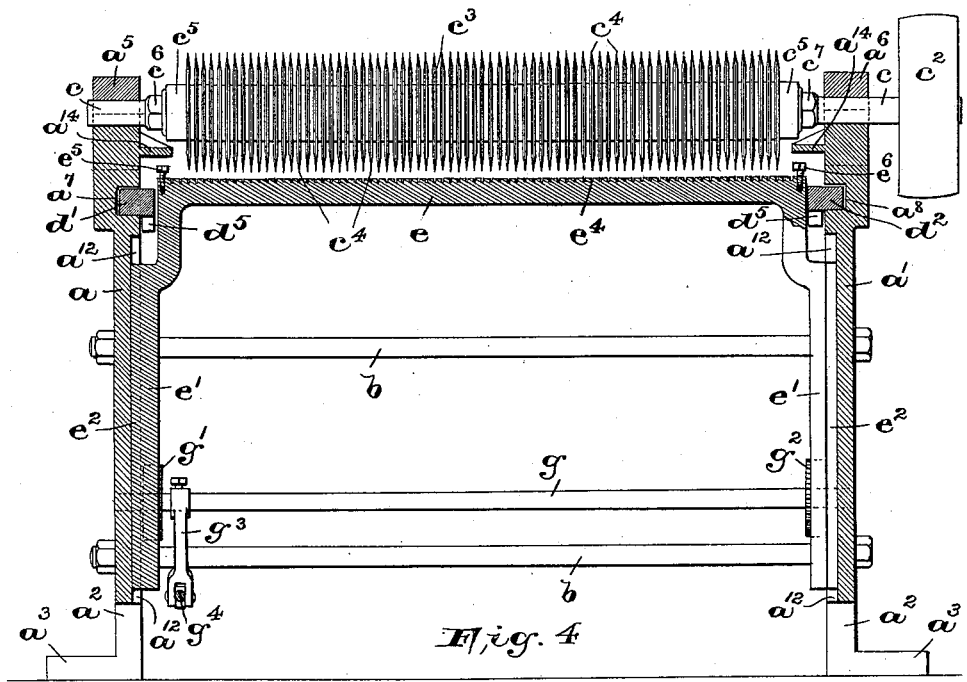
Figure 5:
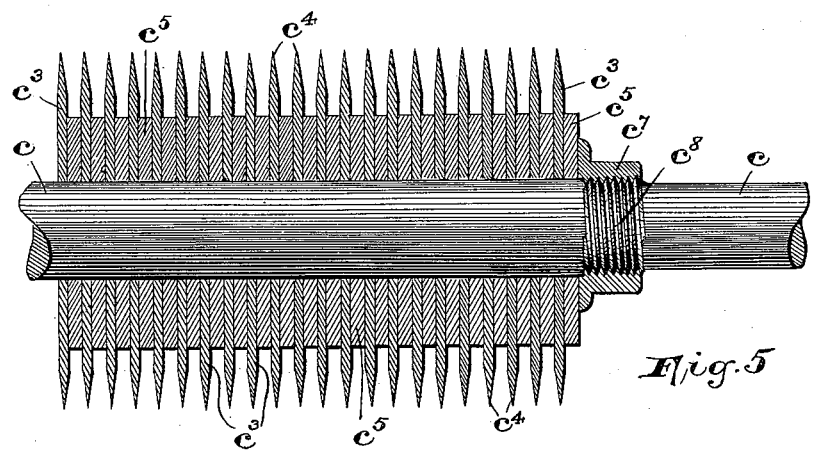
Figure 10:
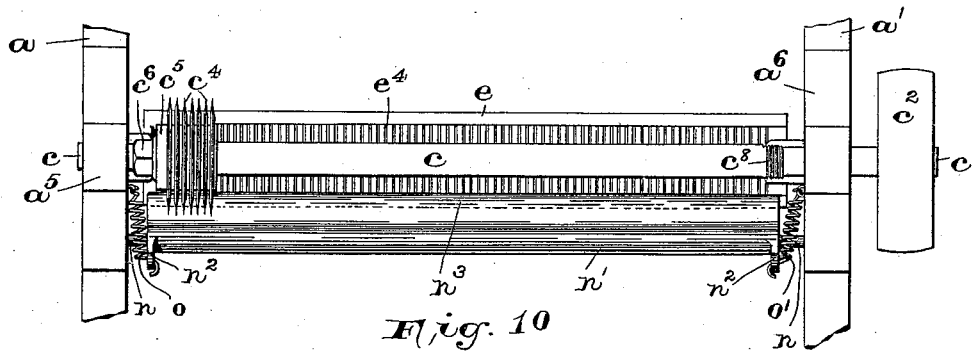
Figure 11:
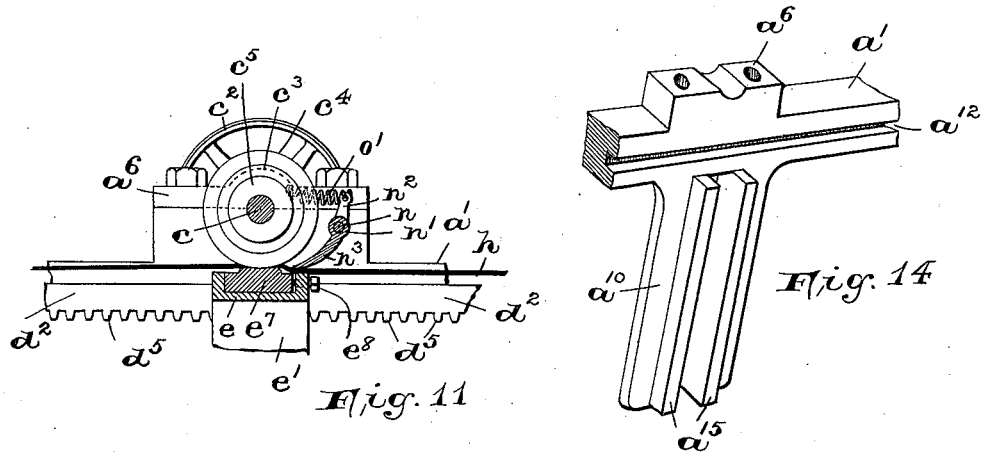
Figure 14:
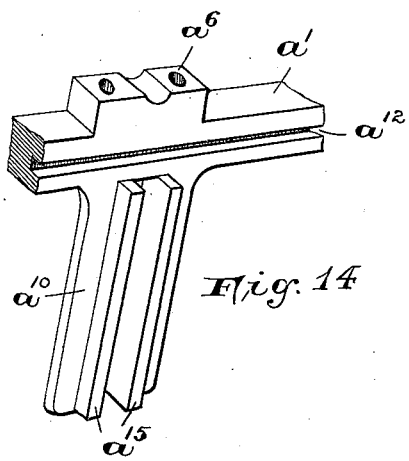
Figure 12:
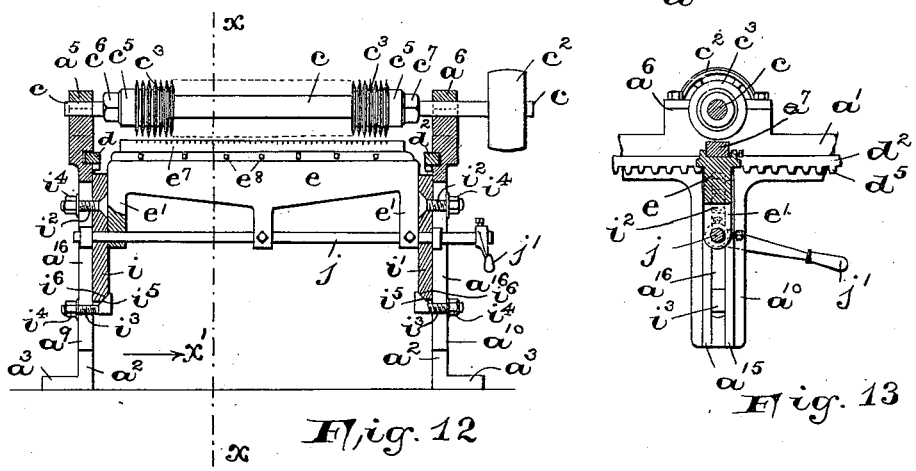
Figure 13:
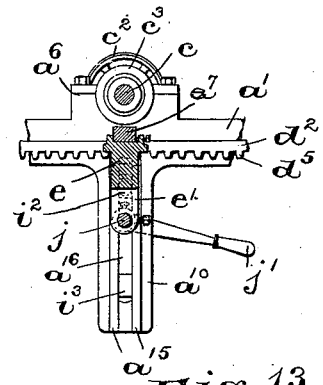

Figure 1 is a perspective view of one form of machine for cutting laces or the like, embodying the principles of my invention. Fig. 2 is a longitudinal vertical section of the same, illustrating a clamping means on one end of a traveling carriage or frame and the skin or hide held thereby and placed between the cutters and the cutting-table, all of said parts being represented in their initial positions when the operator is about to start the machine; and Fig. 3 is a similar view of the machine with the parts in their operative positions and the cutters in the act of cutting the skin or hide or other material. Fig. 4 is a transverse section of the machine on an enlarged scale, and Fig. 5 is a detail showing the arrangement of the cutters on the shaft. Fig. 6 is a side view of the cutting-table; Fig. 7, a top view of the same, and Fig. 8 an end view of the table. Fig. 9 is a perspective view of one end of the traveling carriage and a clamping mechanism connected therewith for securing the one end of the material to be cut to the said carriage or frame. Fig. 10 is a top view of the cutters and cutting-table with part of the frame of the machine, illustrating in connection with said parts the use of a presser-bar. Fig. 11 is a cross-section of the same. Fig. 12 is a transverse section of the machine, illustrating in connection therewith the use of a cutting table or support of a slightly-modified form of construction. Fig. 13 is a cross-section of the same, taken on line $x$ in Fig. 12 and looking in the direction of the arrow $x'$; and Fig. 14 is a perspective view of a suitable guide formed on the side of the frame of the machine when used in connection with the construction of cutting-table illustrated in said Figs. 12 and 13. Fig. 15 is a view of a skin or hide to be cut into narrow strips or laces to be used as shoe-laces or other like purposes.

The construction of machine hereinabove described is especially designed for cutting a skin or hide or any other suitable material at one operation into laces or strips. Heretofore these laces have generally been formed from the skin or hide by cutting the same by hand with a knife or other suitable cutting-tool. This operation is a slow and tedious one, and often results in many of the laces being cut unevenly or otherwise damaged, to avoid which it requires an expert, and hence an expensive, cutter.

By the novel arrangement and construction of the parts comprising the machine herein shown and described all laces or strips are perfectly formed and are of a uniform width, being made in considerably less time than can be done by hand, and hence resulting in a great saving in the cost of manufacture of the laces.

In said above-described views A represents the complete cutting-machine, comprising therein the two side frames $a$ and $a'$, provided with suitable supports or legs $a^2$, having perforated flanges $a^3$ for fastening the said frame-pieces to the floor. Said frame-pieces $a$ and $a'$ are connected by suitable tie-rods $b$, as will be seen from Figs. 1 to 4, inclusive. On the upper portions of the said frames $a$ and $a'$ are suitable bearings $a^5$ and $a^6$, and rotatively arranged therein is a shaft $c$, operated by a belt $c'$, passing over a pulley $c^2$ on the one end of said shaft. The said shaft is provided with cutters $c^3$, having the sharp cutting edges $c^4$, which are arranged and secured on the shaft $c$ in the manner illustrated in Figs. 4 and 5. As will be seen more especially from Fig. 5, the said cutters are slipped upon the shaft with a washer $c^5$ between each two cutters, and when the required number of cutters and washers have been placed upon the shaft suitable nuts $c^6$ and $c^7$ are secured on the screw-threads $c^8$, formed near both ends of said shaft, and being tightly screwed up the cutters are ready for use, the ends of the shaft being rotatively arranged in said bearings $a^5$ and $a^6$ and secured therein in the usual manner. Of course it will be understood that this is but one way of securing the cutters on the shaft $c$, and any other known means of fastening may be employed.

In the inner and opposite surfaces of the two frame-pieces $a$ and $a'$ are suitable grooves $a^7$ and $a^8$, in which is movably arranged the traveling frame or carriage $d$. This frame is light in structure, and the two side pieces $d'$ and $d^2$ are connected at one end by a cross-bar $d^3$ and at the other end by a suitable bar $d^4$, while the under sides of the said side pieces $d'$ and $d^2$ are provided with teeth $d^5$. As will be seen from the several figures of the drawings, said side frames $a$ and $a'$ are also provided with suitable downwardly-extending portions $a^9$ and $a^{10}$, provided with bearings $a^{11}$, in which is rotatively arranged a suitable shaft $f$, having pinions $f'$ secured thereon, which mesh with the teeth $d^5$ on the under sides of the side pieces $d'$ and $d^2$ of the traveling carriage or frame $d$, as will be clearly understood. Said shaft may be provided with a fast pulley $f^2$ and a loose pulley $f^3$ or other suitable means for operating the shaft, and hence the traveling carriage $d$. The belt $f^4$ is connected with any of the well-known forms of shifting devices for throwing the belt from one pulley onto the other to start or stop the machine. As will be seen from Figs. 2, 3, 4, and 7, the said downwardly-extending portions $a^9$ and $a^{10}$ are provided with suitable grooves $a^{12}$, in which are reciprocally arranged certain guides $e^2$ on the downwardly-extending arm $e'$ of a suitable cutting-table $e$. Said arms $e'$ are provided with teeth $e^3$, which are in mesh with pinions $g'$ and $g^2$ on an operating-shaft $g$, arranged in bearings $a^{13}$ on said downwardly-extending portions $a^9$ and $a^{10}$ of the frame of the machine. To raise and lower said cutting table or support $e$ and to bring certain grooves or saw-cuts $e^4$ in the surface of the table directly opposite and comparatively close to the cutting edges of the cutters $c^3$, a crank-arm $g^3$ has been secured to said shaft $g$, said arm being provided with a rod or handle $g^4$, which, when pulled forward, causes the said cutting-table to be raised and held in its raised position by certain notches $g^5$ on said rod $g^4$, which can be placed over the tie-rod $b$, as will be clearly understood from Fig. 1. To regulate and limit the upward movement of said table $e$, two adjusting-screws $e^5$ and $e^6$ are screwed into the top of the table, as clearly shown in Fig. 4, which come in contact with suitable projections or stops $a^{14}$, formed on the inner sides of the frame-pieces $a$ and $a'$, and thereby limit the upward movement of the said table $e$ and prevent injury to the sharp cutting edges $c^4$ of the cutters $c^3$, as will be clearly evident. These screws $e^5$ and $e^6$ are also used to regulate the upward movement of the table $e$ according to the thickness of the hide or skin to be cut. When the table $e$ is to be lowered, the rod $g^4$ is raised and the weight of the table will cause it to be lowered, being guided by the guides $e^2$, moving in the ways or grooves $a^{12}$, and when the table has been sufficiently lowered it is held in its lowered position by again placing one of the notches $g^5$ in the handle $g^4$ over the rod $b$.

Instead of forming the grooves $e^4$ directly in the upper surface of the cutting-table $e$, said table may be provided with upwardly-extending shoulders E and E', between which can be arranged suitable blocks $e^7$ of different lengths, provided with cross-cuts or grooves $e^4$, and which are secured between said shoulders by suitable bolts $e^8$ in screw-threaded holes $e^9$ in one of said shoulders, as will be clearly seen from Figs. 6, 7, and 8. Thus it will be seen that by this arrangement different blocks $e^7$ can be used for cutting hides of skins of different widths into strips or laces, a narrow block being used for a narrow hide or skin and a wide block for a wide hide or skin. When the skin passes over the block, then the irregular sides $h^2$ of the skin $h$ (see Fig. 15) hang down over the sides of the block, and there is no danger of cutting up and wasting the irregular side portions, which are sold and used for other purposes.

In lieu of the arrangement and construction of the cutting-table just described in connection with Figs. 4, 6, 7, and 8, we may use the arrangement illustrated in Figs. 12, 13, and 14.

As will be seen more especially from Fig. 14, the two downwardly-extending portions $a^9$ and $a^{10}$ of the frame-pieces $a$ and $a'$ are provided with inwardly-extending shoulders $a^{15}$ and a slot $a^{16}$ between them. Between said grooves are movably arranged suitable plates $i$ and $i'$, which can be suitably adjusted and are held in their adjusted positions by bolts $i^2$ and $i^3$ and nuts $i^4$, as will be clearly seen from Fig. 12.

The table $e$ is of a construction similar to that described hereinabove, with the exception that the guides $e^2$ on the arms $e'$ are dispensed with and that said arms $e'$ are secured to a rod $j$, which is pivotally arranged in perforations or otherwise in said plates $i$ and $i'$, and is operated by means of a handle $j'$ or by any other well-known means. By loosening the bolts $i^2$ and tightening up the bolts $i^3$ certain inclined parts $i^6$ on said plates $i$ and $i'$ and inclined shoulders $i^5$ on said bolts $i^3$ are made to ride upon each other, whereby the said plates $i$ and $i'$ and the table $e$ can be properly raised, and when adjusted the bolts $i^2$ are tightened and thus hold the parts in place. By turning the handle $j'$ said table $e$ can be brought directly under the cutters for the cutting operation and held there until the skin or hide or other material has been cut into strips or laces.

As will be seen from Figs. 1 and 9, the one end of the traveling carriage or frame $d$ is provided with a clamping device for securing the one end of the skin or hide thereto. This device consists, essentially, of a cross-beam $k$, arranged to slide on pins $l$ and $l'$, which extend from the cross-bar $d^3$ of the frame $d$, substantially as shown. Springs $l^2$ encircle said pins $l$ and $l'$ and normally force said beam $k$ away from the cross piece or bar $d^3$ and against the heads or nuts $l^3$ on said pins. Said cross-bar $d^3$ is provided with a pair of outwardly-extending arms $d^6$, which normally extend through an opening $k'$ in said beam $k$, and between the free ends of said arms $d^6$ is pivoted a cam-lever $m$, which, when brought into operation, forces its cam-shaped end portion $m'$ against the surface of the beam $k$. This causes said beam $k$ to slide back on the pins $l$ and $l'$ and forces certain pointed projections or pins $k^2$ through the skin or hide or other material, entering into perforations $d^7$ in the cross-bar $d^3$ and securely holding the material to be cut in position on the frame $d$, as will be clearly evident.

Of course it will be understood that other suitable means for attaching the end of the material to the traveling frame or carriage $d$ may be employed.

In order to keep the skin or hide or other material taut after it has been attached to the holding device at the end of the frame while passing between the cutters and the upper surface of the cutting-table, a rod or bar $n$ is pivotally arranged in the side frames $a$ and $a'$ of the machine and provided with a presser-bar $n'$. Said bar has two suitable arms, as $n^2$, which are connected by stiff springs $o$ and $o'$ with the frames $a$ and $a'$ and the action of which is to firmly force the lower end $n^3$ of the presser-bar $n'$ in frictional contact with the material being cut into strips or laces, thereby keeping the same sufficiently taut under the cutting edges of the cutters to cause the latter to make a clean and straight cut.

The operation of the machine is as follows: We will first describe the manner of arranging the skin or hide or other material to be cut into strips or laces beneath the cutters. To do this, the cutting-table $e$ is lowered in the manner as has been described hereinabove. The operator then takes hold of the crosspiece $d^4$, connecting the two side pieces $d'$ and $d^2$ of the frame $d$, the belt $f^4$ being on the loose pulley $f^3$, and pulls the said frame $d$ back to the position indicated in Fig. 2. These parts of the machine being of a very light construction, it will be readily seen that the frame can be readily pulled back to such position. When the frame $d$ has thus been pulled back and the adjusting-screws $e^5$ and $e^6$ on the lowered table $e$ have been properly adjusted, the one end of the hide or skin $h$ or other material is placed between the table $e$ and the cutters on the shaft $c$, and said end of the material is securely clamped to the forward end of the frame $d$ by the device illustrated in Fig. 9. This having been done, the table $e$ is now brought into its working position by the mechanism illustrated in Figs. 1 and 4 or that shown in Figs. 12 and 13, thereby bringing the hide or skin against the sharp edges of the cutters on the shaft $c$. The two shafts $c$ and $f$ are now set in motion by means of their respective pulleys and belts passing over the same, causing the cutters to revolve very rapidly, while the traveling carriage or frame $d$ passes slowly in the direction of the arrow D, (shown in Fig. 1,) and the table $e$ remains stationary under the revolving cutter or knives. At the same time said frame $d$ pulls or draws the hide or skin or other material, the opposite end of which is held in the hands of the operator or by any suitable mechanical means beneath the cutters, and the result is that the material is cut into long and narrow strips or laces, which are all of a uniform width, as indicated by the dotted lines in Fig. 15.

Thus it will be seen that from the present constructions and operations of the several parts of mechanism comprising the machine which embodies the principles of the present invention a simply-constructed machine is the result and one which is operative in all respects for the purposes for which it is intended.

It is obvious that the precise form and arrangements of the parts herein shown are not essential to the present invention, and they may be varied without departing from the scope of the invention. Hence we do not limit ourselves to the exact arrangements and combinations of the parts as herein shown.

The broad feature of this invention is the arrangement of a movable, either vertically or pivotally, flat horizontal cutting-table in the supports or frame of the machine, a horizontally-moving frame or carriage, and revolving cutters above the same, whereby hides or skins or any other material can be cut into narrow strips or laces, all of a uniform width, for the purposes herein stated.

From the above description it will be seen that, owing to the fixed position of the cutting table or strip after one end of the hide or skin has been arranged thereon beneath the rotary cutters when the machine is started, the hide or skin will be cut into narrow strips or laces, as indicated by the longitudinally-arranged dotted lines in Fig. 15, leaving at one end of the skin or hide a heading $h^2$ with the laces dangling therefrom. It is very essential that such heading shall be formed, for, previous to coloring the edges of the laces, it allows of the folding of the heading at the top with the laces dangling therefrom for readily coloring the edges of said laces by hand or by machinery. A flat horizontal cutting-table is therefore necessary to the practical use of my machine, since rotating cylinders or rolls provided with circumferential grooves for the cutters will cause the hide or skin to be cut into narrow strips or laces from end to end, which then have to be separately colored, and which is a slow and tedious process.

Having thus described our invention, what we claim is—

1. In a machine for cutting leather or other material into strips or laces, the combination, of a machine-frame, a horizontally-moving frame or carriage, cutters arranged on a shaft in bearings in the frame of the machine, and a cutting-table movably arranged beneath said cutters, substantially as and for the purposes set forth.

2. In a machine for cutting leather or other material into strips or laces, the combination, of a machine-frame, a horizontally-moving frame or carriage, cutters arranged on a shaft in bearings in the frame of the machine, and a cutting-table movably arranged beneath said cutters, said table having cross-cuts or grooves in its upper surface, substantially as and for the purposes set forth.

3. In a machine for cutting leather or other material into strips or laces, the combination, of a machine-frame, having vertically-arranged grooves, a horizontally-moving frame or carriage, cutters arranged on a shaft in bearings in the frame of the machine, and a cutting-table movably arranged beneath said cutters and vertically adjustable in said grooves, substantially as and for the purposes set forth.

4. In a machine for cutting leather or other material into strips or laces, the combination, of a machine-frame, having vertically-arranged grooves, a horizontally-moving frame or carriage, cutters arranged on a shaft in bearings in the frame of the machine, a cutting-table movably arranged beneath said cutters and vertically adjustable in said grooves, and means for limiting the upward movement of said table, substantially as and for the purposes set forth.

5. In a machine for cutting leather or other material into strips or laces, the combination, of a machine-frame, a horizontally-moving frame or carriage, means connected therewith, for attaching the one end of the material to be cut to said frame or carriage, cutters arranged on a shaft in bearings in the frame of the machine, and a cutting-table movably arranged beneath said cutters, substantially as and for the purposes set forth.

6. In a machine for cutting leather or other material into strips or laces, the combination, of a machine-frame, cutters arranged on a shaft in bearings in said frame, and a cutting-table, said table having blocks, as $e^7$, provided with grooves, and means for securing said blocks in position on said table, substantially as and for the purposes set forth.

7. In a machine for cutting leather or other material into strips or laces, a cutting-table, as $e$, having shoulders or projections, and blocks, as $e^7$, provided with grooves, said blocks being removably arranged between said shoulders or projections, and means for securing said blocks in position on said table, substantially as and for the purposes set forth.

8. In a machine for cutting leather or other material into strips or laces, the combination, of a machine-frame, a frame or carriage $d$ movable horizontally in ways in the frame of the machine, teeth, as $d^5$, on said frame or carriage, a pinion meshing with said teeth, and means for operating the same, cutters arranged on a shaft in bearings in said frame, and a cutting-table beneath said cutters, substantially as and for the purposes set forth.

9. In a machine for cutting leather or other material into strips or laces, the combination, of a machine-frame, a frame or carriage $d$ movable horizontally in ways in the frame of the machine, teeth, as $d^5$, on said frame or carriage, a pinion meshing with said teeth, and means for operating the same, cutters arranged on a shaft in bearings in said frame, and a cutting-table beneath said cutters, said table being adjustable and having cross-cuts or grooves, substantially as and for the purposes set forth.

10. In a machine for cutting leather or other material into strips or laces, the combination, of a machine-frame, cutters arranged on a shaft in bearings in said frame, a horizontally-moving carriage or frame, a cutting-table movably arranged beneath said cutters, and a presser-bar adapted to press or spread the material to be cut on said table, while passing beneath the cutters, substantially as and for the purposes set forth.

11. In a machine for cutting leather or other material into strips or laces, the combination, of a machine-frame, cutters arranged on a shaft in bearings in said frame, a horizontally-moving carriage or frame, a cutting-table movably arranged beneath said cutters, and a presser-bar pivotally arranged in the frame of the machine, having the curved portion $n^3$ for exerting pressure on the material to be cut, arms $n^2$ on said presser-bar, and springs $o$ and $o'$, all arranged, substantially as and for the purposes set forth.

In testimony that we claim the invention set forth above we have hereunto set our hands this 26th day of January, 1895.

PHILIP GOLDSTEIN.
GUSTAV ANDRAE.

Witnesses:
WM. H. CAMFIELD, Jr.,
FREDK. C. FRAENTZEL.